(12) United States Patent
Agrawal et al.

(10) Patent No.: US 9,258,311 B2
(45) Date of Patent: Feb. 9, 2016

(54) VIRTUAL FEDERATION OF REMOTE PORTALS

(75) Inventors: Pramod Agrawal, Bangalore (IN);
Senthil Kumaran, Coimbatore (IN);
Vijay Subramanian, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 634 days.

(21) Appl. No.: 13/533,112

(22) Filed: Jun. 26, 2012

(65) Prior Publication Data

US 2013/0086694 A1 Apr. 4, 2013

Related U.S. Application Data

(60) Provisional application No. 61/541,183, filed on Sep. 30, 2011.

(51) Int. Cl.
*H04L 29/06* (2006.01)
*H04L 29/08* (2006.01)
*G06F 9/46* (2006.01)

(52) U.S. Cl.
CPC .............. *H04L 63/105* (2013.01); *G06F 9/468* (2013.01); *H04L 67/2838* (2013.01)

(58) Field of Classification Search
CPC ................... H04L 63/00; H04L 63/04; H04L 63/08–63/083; H04L 63/0884; H04L 63/10–63/105; H04L 67/00; H04L 67/28; H04L 67/2838; H04L 67/2866; H04L 67/2871; H04L 67/2895; H04L 67/30; H04L 67/306; H04L 67/42; G06F 9/468

USPC ........ 726/1–7, 12, 26–28; 709/203, 217, 219, 709/225
See application file for complete search history.

(56) References Cited

U.S. PATENT DOCUMENTS

| | | | |
|---|---|---|---|
| 6,918,088 B2 * | 7/2005 | Clark et al. | 715/742 |
| 7,496,954 B1 * | 2/2009 | Himawan et al. | 726/8 |
| 7,600,027 B2 * | 10/2009 | Yan | 709/227 |
| 8,548,909 B1 * | 10/2013 | Snow et al. | 705/42 |

(Continued)

OTHER PUBLICATIONS

Sha et al., "A Mechanism to Implement Virtual Identity Federation" [Online], Jul. 9-11, 2010 [Retrieved Aug. 14, 2015], ICCSIT, IEEE, Retrieved from: < http://ieeexplore.ieee.org/stamp/stamp.jsp?tp=&arnumber=5565072 >.*

*Primary Examiner* — Eric W Shepperd
(74) *Attorney, Agent, or Firm* — Kilpatrick Townsend & Stockton LLP (57) ABSTRACT

Embodiments of the invention provide systems and methods for providing a virtual federation of remote portals. According to one embodiment, providing a virtual federation of remote portals can comprise defining, by a portal system, a configuration of a virtual federation of a plurality of nodes. For example, each node can comprise an application server executing a different enterprise application and maintaining application content for the enterprise application in a separate database. The portal system can also define access control information for a user of the portal system. Each node of the virtual federation can similarly define access control information for the user. The system can then provide access to the application content of the nodes at runtime based on the configuration of the virtual federation and the access control information for the user defined by the portal system and the access control information for the user defined by the nodes.

17 Claims, 4 Drawing Sheets

(56) References Cited

U.S. PATENT DOCUMENTS

| | | | |
|---|---|---|---|
| 2002/0188458 A1* | 12/2002 | Babbrah | 705/1 |
| 2003/0120593 A1* | 6/2003 | Bansal et al. | 705/39 |
| 2004/0068568 A1* | 4/2004 | Griffin et al. | 709/227 |
| 2005/0060337 A1* | 3/2005 | Chou et al. | 707/102 |
| 2005/0114701 A1* | 5/2005 | Atkins et al. | 713/201 |
| 2005/0198121 A1* | 9/2005 | Daniels et al. | 709/203 |
| 2005/0210297 A1* | 9/2005 | Wu et al. | 713/202 |
| 2006/0129816 A1* | 6/2006 | Hinton | 713/169 |
| 2006/0235935 A1* | 10/2006 | Ng | 709/208 |
| 2007/0067265 A1* | 3/2007 | Husfelt et al. | 707/3 |
| 2007/0282616 A1* | 12/2007 | Brunswig et al. | 705/1 |
| 2008/0263152 A1* | 10/2008 | Daniels et al. | 709/203 |
| 2008/0263629 A1* | 10/2008 | Anderson | 726/2 |
| 2009/0089625 A1* | 4/2009 | Kannappan et al. | 714/39 |
| 2009/0217287 A1* | 8/2009 | Blum et al. | 718/105 |
| 2014/0134588 A1* | 5/2014 | Capone et al. | 434/322 |

\* cited by examiner

VIRTUAL FEDERATION OF REMOTE PORTALS

CROSS-REFERENCES TO RELATED APPLICATIONS

The present application claims benefit under 35 USC 119 (e) of U.S. Provisional Application No. 61/541,183, filed on Sep. 30, 2011 by Agrwal et al. and entitled "VIRTUAL FEDERATION OF REMOTE PORTALS," of which the entire disclosure is incorporated herein by reference for all purposes.

BACKGROUND OF THE INVENTION

Embodiments of the present invention relate generally to methods and systems for providing a virtual federation of remote portals and more particularly to providing a federation that dynamically accesses remote and separate portals to retrieve application content at runtime.

Today portal federations are available but it is not virtually federated and it is implemented with limitations. First, a portal content's data pointer/link has to be copied manually to the federated portal and the integrity of this pointer/link has to be maintained manually which creates a never ending maintenance process for the customers. Also, user's security synchronization has to be done manually across the portals to federate. Due to these limitations, portal customers need to perform an initial setup for the federation including manually copying or importing the content pointer/link from different portals and manually copying or importing the user's security information from different portals. These systems also require constant maintenance work including but not limited to manually maintaining the integrity of the remote portal's content pointer/link manually for any change/unavailable, manually update/upgrade imported remote portal's pointer/link after any changes, updating or synchronizing portals manually on user security information changes, etc. Hence, there is a need for improved methods and systems for providing a virtual federation of remote portals that dynamically accesses remote and separate portals to retrieve application content at runtime.

BRIEF SUMMARY OF THE INVENTION

Embodiments of the invention provide systems and methods for providing a virtual federation of remote portals. According to one embodiment, providing a virtual federation of remote portals can comprise defining, by a portal system, a configuration of a virtual federation of a plurality of nodes. For example, each node can comprise an application server executing a different enterprise application and maintaining application content for the enterprise application in a separate database. The portal system can also define access control information for a user of the portal system. Each node of the virtual federation can similarly define access control information for the user. The portal system and one or more of the nodes can then provide access to the application content of the nodes at runtime based on the configuration of the virtual federation and the access control information for the user defined by the portal system and the access control information for the user defined by the nodes.

More specifically, providing access to the application content of the nodes at runtime can comprise receiving, by the portal system, a request from the user for application content from at least one of the nodes of the virtual federation. The portal system and the at least one node can retrieve, at runtime, the requested application content based on the configuration of the virtual federation, the access control information for the user defined by the portal system, the access control information for the user defined by the at least one node, and a current login of the user at the portal system. The retrieved application content can be presented to the user by the portal system in response to the request through an interface of the portal system.

In some cases, one or more of the nodes of the virtual federation can maintain in the database for that node one or more templates for the application content. In such cases, retrieving the requested application content can further comprise retrieving the templates for the retrieved application content. The one or more templates can define, for example, an output format for the application content. In such cases, presenting the retrieved application content can be further based on the retrieved templates. Additionally or alternatively, the application content of each node can comprise one or more content objects of the enterprise application of the node. In such cases, the configuration of the virtual federation can comprise a list of references to a plurality of portals of the enterprise applications through which content objects on one or more nodes of the virtual federation are accessed.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for providing a virtual federation of remote portals that dynamically accesses remote and separate portals to retrieve application content at runtime. More specifically, embodiments of the present invention provide for a federation in which aspects of the portal can be "virtual". In other words, accessing/sharing the remote content doesn't require any physical link/pointer because the remote content pointers/links are automatically available without copying it physically by doing the simple configuration. Since the remote data can be virtual, a user or administrator will have little or no maintenance work to maintain the remote content pointer's/link's integrity between the local and remote portal system even if the pointers/links are deleted/altered in the remote portal. The remote data security mechanism can also work virtually by validating the user access at runtime in the remote system before displaying the remote data. Here the data security doesn't require any manual copy of users security between the local and remote portal and no manual security synchronization is needed. Various additional details of embodiments of the present invention will be described below with reference to the figures.

Figure 1:
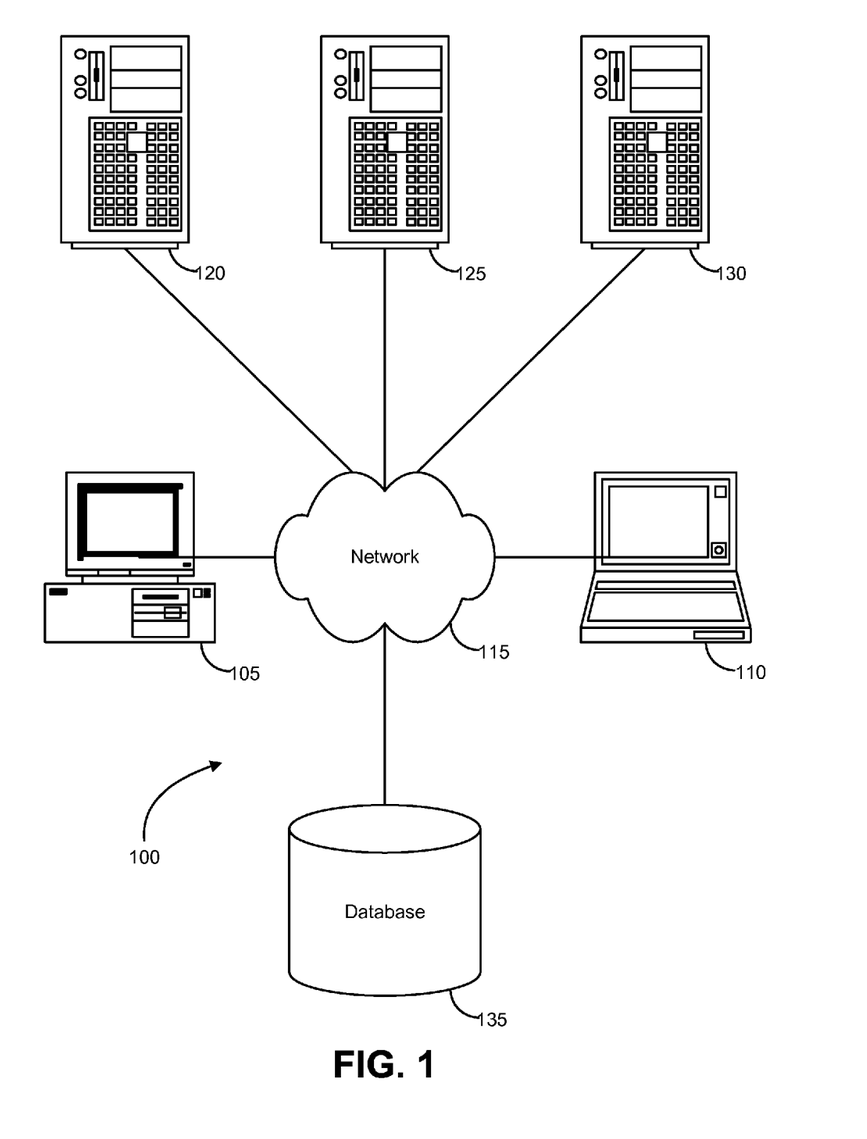
FIG. 1 is a block diagram illustrating components of an exemplary operating environment in which various embodiments of the present invention may be implemented.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may be any type of network familiar to those skilled in the art that can support data communications using any of a variety of commercially-available protocols, including without limitation TCP/IP, Systems Network Architecture, Internet work Packet Exchange, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, Common Gateway Interface servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or Tool Command Language, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 120, 125, 130. Alternatively, it may be remote from any or all of the computers 105, 110, 120, 125, 130, and/or in communication (e.g., via the network 115) with one or more of these. In a particular set of embodiments, the database 135 may reside in a storage-area network ("SAN") familiar to those skilled in the art. Similarly, any necessary files for performing the functions attributed to the computers 105, 110, 120, 125, 130 may be stored locally on the respective computer and/or remotely, as appropriate. In one set of embodiments, the database 135 may be a relational database, such as Oracle 10 g, that is adapted to store, update, and retrieve data in response to SQL-formatted commands.

Figure 2:
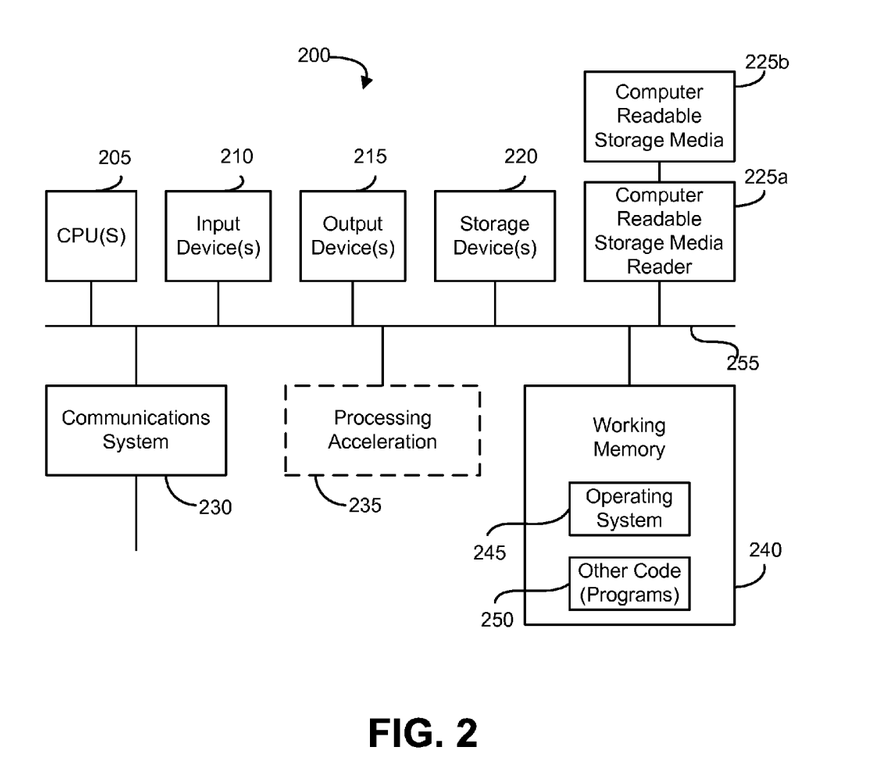
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a Digital Signal Processor, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
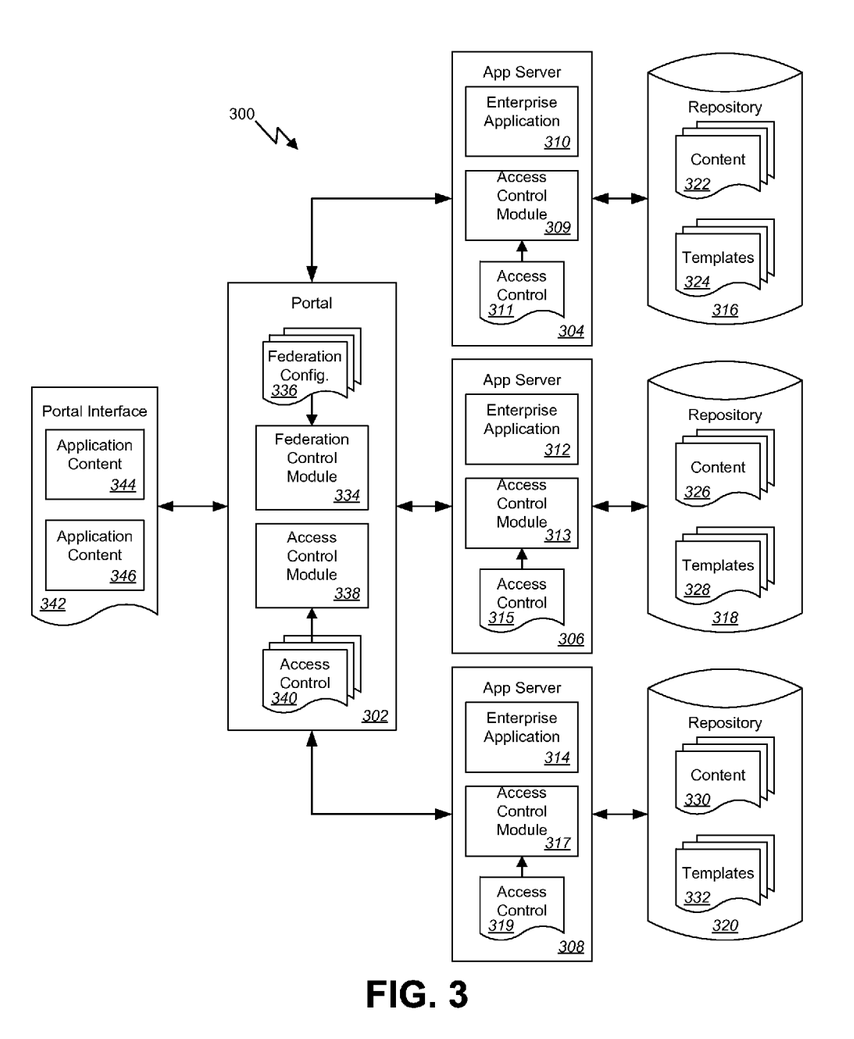
FIG. 3 is a block diagram illustrating, at a high-level, functional components of a system for providing a virtual federation of remote portals according to one embodiment of the present invention.

FIG. 3 is a block diagram illustrating, at a high-level, functional components of a system for providing a virtual federation of remote portals according to one embodiment of the present invention. In this example, the system 300 includes a portal system 302 and a number of remote application servers 304, 306, and 308 separate from the portal system 302 and each other. Each application server 304, 306, and 308 can execute a different enterprise application 310, 312, and 314. Each enterprise application 310, 312, and 314 can maintain a set of application content 322, 326, and 330 in a separate repository 316, 318, and 320 such as a database executed and maintained by the respective application server 304, 306, and 308. For example, one of the enterprise applications 310 may comprise an Enterprise Resource Management (ERP) application and the application content can comprise any of a variety of human resource records such as employee records, payroll information, etc. Another application 312 can include a financials application and the corresponding application content objects 326 can comprise any of a variety of ledgers, account information, etc. Each application 310, 312, and 314 can also maintain in the respective repositories 316, 318, and 320, one or more templates related to the applications 310, 312, and 314 and the corresponding application content 322, 326, and 330. These templates 324, 328, 332 can comprise, for example, HyperText Markup Language (HTML) or other pre-defined templates that can be used to display or present the corresponding content objects. For example, the templates 324, 328, 332 can be used to control the format, look-and-feel, branding, and/or other visual, contextual, or other aspects of the content objects when displayed to a user.

According to one embodiment, the portal system 302 can include a federation control module 334 that can be accessible to an administrator or other user to define a set of federation configuration information 336. This configuration information 336 can comprise a list of links, such as, for example, Uniform Resource Locators (URLs) to the various enterprise applications 310, 312, and 314. More specifically, these links or other references can point to an access portal of the individual applications 310, 312, and 314 through which the applications 310, 312, and 314 can be accessed and the various content objects 322, 326, and 330 and template 324, 328, and 332 can be requested. In this way, the various content objects 322, 326, and 330 and template 324, 328, and 332 can be requested, accessed and retrieved at runtime of the applications 310, 312, and 314 without a need to first identify and copy the content objects 322, 326, and 330 and templates 324, 328, and 332 from the remote application servers 304, 306, and 308 to the portal system 302. Once requested, retrieved by the remote application servers 304, 306, 308, and returned to the portal system in response to the request, the returned content 344 and 346 can be presented, e.g., displayed, perhaps based on retrieved and returned templates, if any, in a portal interface 342.

The portal system 302 can also include an access control module 338. This access control module 338 can be accessible to an administrator of the portal system 302 and can be used to define a set of access control information 340 such as access rights for particular users. According to one embodiment, this access control module 338 can determine or control whether to display a pointer or link of the enterprise applications 310, 312, and/or 314 based on the access control information 340. So in use, a user logged into portal system 302 can send a request to one or more of the enterprise application 310, 312 and/or 314 to fetch content. Access control modules 309, 313, and/or 317 of the application servers 304, 306, and/or 308 can determine whether the user logged into the portal system 302 has access to the content 322, 326, and/or 330 and/or templates 324, 328, and/or 332. If the user has access, enterprise applications 310, 312, and/or 314 can return the content/template to portal system 302. As mentioned, each enterprise application 310, 312, and 314 can have defined on the application server 304, 306, and 308 its own access control information 311, 315, and 319 which can be applied when the portal system 302 makes the request for the respective application content 322, 326, and/or 330 and/or template 324, 328, and/or 332. This process can help eliminate the process of copying and synchronizing the set of access control information for the particular user in the portal system 302.

Stated another way, providing a virtual federation of remote portals can begin with defining, by the portal system 302, a configuration 336 of the virtual federation of a plurality of nodes. Each node can comprise, for example, an application server 304, 306, and 308 executing a different enterprise application 310, 312, and 314 and maintaining application content 322, 326, and 330 for the respective enterprise application 310, 312, and 314 in a separate database 316, 318, and 320. In some cases, the application content 322, 326, and 330 of each node can comprise one or more content objects of the enterprise application 310, 312, and 314 of the node. In such cases, the configuration 336 of the virtual federation can comprise a list of references to a portal of the enterprise application 310, 312, and 314 through which the plurality of content objects can be accessed on one or more nodes of the virtual federation. The portal system 302 can also define access control information 340 for a user of the portal system 302. The portal system 302 can provide access to the application content 322, 326, and 330 of the plurality of nodes at runtime based on the configuration 336 of the virtual federation and the access control information 340 for the user.

After the configuration 336 of the virtual federation has been defined and the access control information 340, 311, 315, and 319 for the user has been defined, a request can be received at the portal system 302 from the user for application content 322, 326, and 330 from at least one of the nodes of the virtual federation. The requested application content can be retrieved based on the configuration 336 of the virtual federation and the access control information 340, 311, 315, and 319 for the user. For example, a user logged into the portal system 302 can make the request for the content 322 from enterprise application 310. This user can be validated by the access control module 338 of the portal 302 based on the access control information 340 thereof and access control 309 of the enterprise application 310 and access control information 311 thereof. If the user is determined to have access, enterprise application 310 can retrieve and return the requested content 322 and template 324 to the portal system 302.

Thus, retrieving the requested application content can be based on the access control information 311, 315, and 319 for the user and on a current login of the user at the portal system 302. In some cases, one or more of the nodes of the virtual federation can maintain in the database 316, 318, and 320 for that node one or more templates 324, 328, and 332 for the application content 322, 326, and 330. In such cases, retrieving the requested application content 322, 326, and 330 can further comprise retrieving the templates 324, 328, and 332 for the retrieved application content. The retrieved application content 344 and 346 can then be presented to the user in response to the request through an interface 342 of the portal system 302. If any templates were retrieved, the one or more templates can define an output format for the application content. In such cases, presenting the retrieved application content 344 and 346 can be further based on the retrieved templates.

Figure 4:
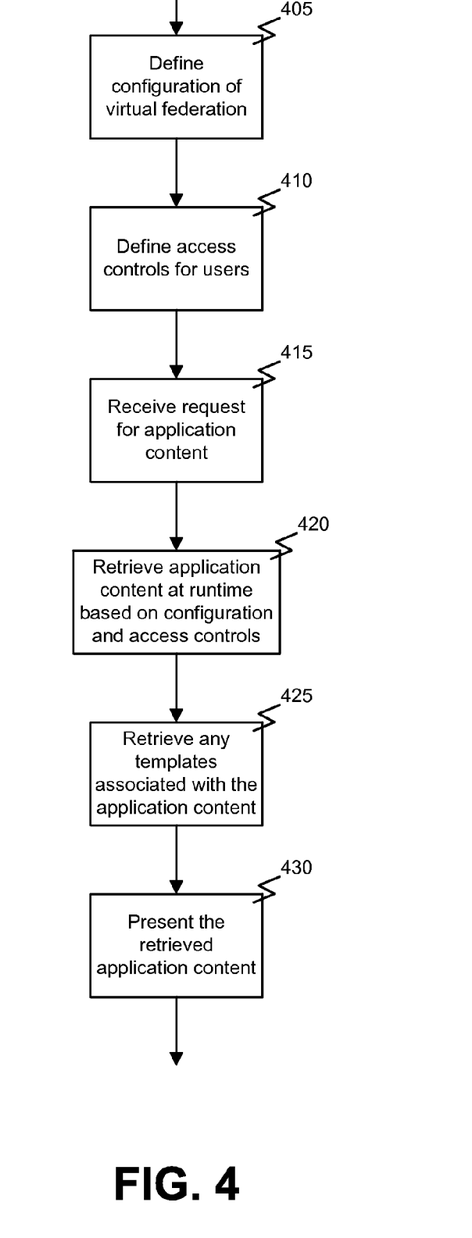
FIG. 4 is a flowchart illustrating a process for providing a virtual federation of remote portals according to one embodiment of the present invention.

FIG. 4 is a flowchart illustrating a process for providing a virtual federation of remote portals according to one embodiment of the present invention. In this example, providing a virtual federation of remote portals can begin with defining 405 a configuration of a virtual federation of a plurality of nodes. Each node can comprise, for example, an application server executing a different enterprise application and maintaining application content for the enterprise application in a separate database. In some cases, the application content of each node can comprise one or more content objects of the enterprise application of the node. In such cases, the configuration of the virtual federation can comprise a list of references to a plurality of portals of the enterprise application through which content objects on one or more nodes of the virtual federation can be accessed. The process an also include defining 410 access control information for a user of the portal system. The portal system can provide access to the application content of the plurality of nodes at runtime based on the configuration of the virtual federation and the access control information for the user.

For example, after the configuration of the virtual federation has been defined 405 and the access control information for the user has been defined 410, a request can be received 415 from the user for application content from at least one of the nodes of the virtual federation. The requested application content can be retrieved 420 based on the configuration of the virtual federation and the access control information for the user. For example, retrieving 420 the requested application content can be based on the enterprise application access control information for the user and on a current login of the user at the portal system. In some cases, one or more of the nodes of the virtual federation can maintain in the database for that node one or more templates for the application content. In such cases, retrieving 420 the requested application content can further comprise retrieving 425 the templates for the retrieved application content. The retrieved application content can then be presented 430 to the user in response to the request through an interface of the portal system. If any templates were retrieved 425, the one or more templates can define an output format for the application content. In such cases, presenting 430 the retrieved application content can be further based on the retrieved templates.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of providing a virtual federation of remote portals, the method comprising:
    executing, by each of a plurality of different application servers, one of a plurality of different applications, each application server maintaining application content objects for the application in a separate database and each application providing an access portal;
    defining, by a portal system, a configuration of a virtual federation of a plurality of nodes, each node comprising a different one of the plurality of different application servers, the configuration of the virtual federation comprising a list of references to the access portal of each of the plurality of different applications and without reference to any of the application content objects;
    defining, by the portal system, access control information for a user of the portal system, the access control information of the portal system defining which of the plurality of different applications are accessible by the user;
    defining, by each node of the plurality of nodes of the virtual federation, access control information for the user, the access control information of the node defining which of the application content objects are accessible by the user; and
    providing, by the virtual federation of the plurality of nodes through the portal system, access to the application content objects of each node at runtime based on the configuration of the virtual federation and the access control information for the user defined by the portal system and the access control information for the user defined by each node.

2. The method of claim 1, wherein providing access to the application content objects of the nodes at runtime comprises:
    receiving, by the portal system, a request from the user for application content from at least one of the nodes of the virtual federation;
    retrieving, by the portal system and the at least one node at runtime, one or more application content objects based on the configuration of the virtual federation, the access control information for the user defined by the portal system, and the access control information for the user defined by the at least one node; and
    presenting, by the portal system, the retrieved application content objects to the user in response to the request through an interface of the portal system.

3. The method of claim 2, wherein retrieving the one or more application content objects based on the configuration of the virtual federation, the access control information for the user defined by the portal system, and the access control information for the user defined by the at least one node is further based on a current login of the user at the portal system.

4. The method of claim 2, wherein at least one of the nodes of the virtual federation maintains in the database for the at least one node one or more templates for the application content objects.

5. The method of claim 4, wherein retrieving the one or more application content objects further comprises retrieving the one or more templates for the retrieved application content objects.

6. The method of claim 5, wherein the one or more templates define an output format for the application content and wherein presenting the retrieved application content objects is further based on the retrieved templates.

7. A system comprising:
    a processor; and
    a memory coupled with and readable by the processor and storing therein a set of instructions which, when executed by the processor, causes the processor to provide a virtual federation of remote portals by:
        executing, by each of a plurality of different application servers, one of a plurality of different applications, each application server maintaining application content objects for the application in a separate database and each application providing an access portal;
        defining, by a portal system, a configuration of a virtual federation of a plurality of nodes, each node comprising a different one of the plurality of different application servers, the configuration of the virtual federation comprising a list of references to the access portal of each of the plurality of different applications and without reference to any of the application content objects;
        defining, by the portal system, access control information for a user of the portal system, the access control information of the portal system defining which of the plurality of different applications are accessible by the user;
        defining, by each node of the plurality of nodes of the virtual federation, access control information for the user, the access control information of the node defining which of the application content objects are accessible by the user; and
        providing, by the virtual federation of the plurality of nodes through the portal system, access to the application content objects of each node at runtime based on the configuration of the virtual federation and the access control information for the user defined by the portal system and the access control information for the user defined by each node.

8. The system of claim 7, wherein providing access to the application content objects of the application servers at runtime comprises:
    receiving, by the portal system, a request from the user for application content from at least one of the application servers of the virtual federation;
    retrieving, by the portal system and the at least one application server at runtime, one or more application content objects based on the configuration of the virtual federation, the access control information for the user defined by the portal system, and the access control information for the user defined by the at least one application server; and
    presenting, by the portal system, the retrieved application content objects to the user in response to the request through an interface of the portal system.

9. The system of claim 8, wherein retrieving the one or more application content objects based on the configuration of the virtual federation, the access control information for the user defined by the portal system, and the access control information for the user defined by the at least one application server is further based on a current login of the user at the portal system.

10. The system of claim 8, wherein at least one of the application servers of the virtual federation maintains in the database for the at least one application server one or more templates for the application content objects.

11. The system of claim 10, wherein retrieving the one or more application content objects further comprises retrieving the one or more templates for the retrieved application content objects.

12. The system of claim 11, wherein the one or more templates define an output format for the application content and wherein presenting the retrieved application content objects is further based on the retrieved templates.

13. A computer-readable memory device having stored thereon a sequence of instructions which, when executed by one or more processors, causes the one or more processors to provide a virtual federation of remote portals by:

executing, by each of a plurality of different application servers, one of a plurality of different applications, each application server maintaining application content objects for the application in a separate database and each application providing an access portal;

defining, by a portal system, a configuration of a virtual federation of a plurality of nodes, each node comprising a different one of the plurality of different application servers, the configuration of the virtual federation comprising a list of references to the access portal of each of the plurality of different applications and without reference to the application content objects;

defining, by the portal system, access control information for a user of the portal system, the access control information of the portal system defining which of the plurality of different applications are accessible by the user;

defining, by each node of the plurality of nodes of the virtual federation, access control information for the user, the access control information of the node defining which of the application content objects are accessible by the user; and providing, by virtual federation of the plurality of nodes through the portal system, access to the application content objects of each node at runtime based on the configuration of the virtual federation and the access control information for the user defined by the portal system and the access control information for the user defined by each node.

14. The computer-readable memory device of claim 13, wherein providing access to the application content objects of the nodes at runtime comprises:

receiving, by the portal system, a request from the user for application content from at least one of the nodes of the virtual federation;

retrieving, by the portal system and the at least one node at runtime, one or more application content objects based on the configuration of the virtual federation, the access control information for the user defined by the portal system, and the access control information for the user defined by the at least one node; and presenting, by the portal system, the retrieved application content objects to the user in response to the request through an interface of the portal system.

15. The computer-readable memory device of claim 14, wherein retrieving the one or more application content objects based on the configuration of the virtual federation, the access control information for the user defined by the portal system, and the access control information for the user defined by the at least one node is further based on a current login of the user at the portal system.

16. The computer-readable memory device of claim 14, wherein at least one of the nodes of the virtual federation maintains in the database for the at least one node one or more templates for the application content objects.

17. The computer-readable memory device of claim 16, wherein retrieving the one or more application content objects further comprises retrieving the one or more templates for the retrieved application content objects, wherein the one or more templates define an output format for the application content and wherein presenting the retrieved application content objects is further based on the retrieved templates.

\* \* \* \* \*